United States Patent Office 3,494,921
Patented Feb. 10, 1970

3,494,921
1,4-DISUBSTITUTED PYRIDAZINO[4,5-d] PYRIDAZINES
Linneaus C. Dorman, Midland, Mich., assignor to The Dow Chemical Company, Midland, Mich., a corporation of Delaware
No Drawing. Filed Aug. 29, 1968, Ser. No. 756,293
Int. Cl. C07d *51/12;* A61k *27/00;* A01n *9/22*
U.S. Cl. 260—250                                                           6 Claims

ABSTRACT OF THE DISCLOSURE

Novel 1,4-disubstituted pyridazino[4,5-d]-pyridazines are disclosed having the formula

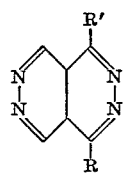

wherein R represents lower alkylthio or lower alkoxy and R' represents lower alkylthio, di(lower alkyl)amino or [2-[di(lower alkyl)amino]ethyl]amino. The 1,4-bis(lower alkylthio)pyridazino[4,5-d]pyridazine compounds are intermediates for the preparation of the other 1,4-disubstituted pyridazino[4,5-d]pyridazines, which latter compounds are valuable as pesticides and depressants of the nervous system of animals such as vertebrates.

Summary of the invention

This invention concerns new 1,4-disubstituted pyridazino[4,5-d]pyridazines corresponding to the formula

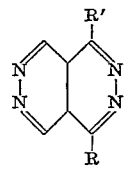

In this and succeeding formulas, R represents a lower alkylthio or a lower alkoxy group and R' represents a lower alkylthio, a di(lower alkyl)amino or a [2-[di(lower alkyl)amino]ethyl]amino group. In the present specification and claims, the terms "lower alkyl" and "lower alkoxy" represent groups containing 1, and 2, and 3, and 4 carbon atoms, such as methyl, ethyl, propyl, isopropyl, butyl, isobutyl, tertiary butyl, methoxy, ethoxy, propoxy, isopropoxy (butoxy and isobutoxy; while the term "di(lower alkyl)amino" represents an amino group having two lower alkyl groups substituted in place of amino hydrogen atoms.

The new compounds of the present invention are high melting point crystalline solids. They have low solubilities in water and acetone, and somewhat higher solubilities in benzene. The new 1,4-disubstituted pyridazino[4,5-d]-pyridazines are depressants of the central nervous system of vertebrates, particularly useful as analgesics. They are also herbicides, particularly useful for inhibiting the growth of grasses. The new 1,4-bis(lower alkylthio)pyridazino[4,5-d]pyridazines are intermediates for the other compounds.

Representative compounds of the present invention include 1,4 - bis(methylthio)pyridazino[4,5 - d]pyridazine, 1,4-bis(butylthio)pyridazino[4,5-d]pyridazine, 1-(dimethylamino) - 4 - methoxypyridazino[4,5 - d]pyridazine, 1- (dibutylamino) - 4 - butoxypyridazino[4,5-d]pyridazine, 1 - [2 - (dimethylamino)ethyl]amino - 4 - methoxypyridazino[4,5 - d]pyridazine, 1 - [2 - (dipropylamino)-ethyl]amino - 4 - propoxypyridazino[4,5-d]pyridazine, 1- [2 - (dimethylamino)ethyl]amino - 4 - methylthiopyridazine, and 1 - butoxy - 4 - (butylthio)pyridazino[4,5 - amino - 4 - (propylthio)pyridazino[4,5 - d]pyridazine, 1 - methoxy - 4 - (methylthio)pyridazino[4,5 - d]pyridazine, 1 - ethoxy - 4 - (ethylthio)pyridazino[4,5 - d]pyridazine, and 1 - butoxy - 4 - (butylthio)pyridazino[4,5-d]pyridazine. Preferred compounds of the present invention are those wherein lower alkyl is methyl.

The compounds of this invention are prepared by way of the following procedural steps. In the first step, 4,5-pyridazine dicarboxylic acid is condensed with hydrazine according to the following equation:

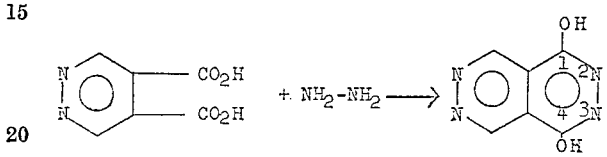

Equation I

Thereafter, functional groups are introduced at the 1- and 4-positions which are capable of undergoing stepwise nucleophilic displacement or removal to form the 1,4-disubstituted pyridazino[4,5-d]pyridazines of this invention. The functional groups introduced at the 1- and 4-positions capable of undergoing stepwise nucleophilic displacement or removal to form the compounds of this invention are lower alkylthio groups, preferably methylthio groups. In other words, the novel 1,4-bis(lower alkylthio)pyridazino[4,5-d]pyridazines are the intermediates for the synthesis of the other compounds of this invention. The 1,4-disubstituted compounds of this invention are obtained by nucleophilic substitution reactions wherein a lower alkylthio group is substituted by a lower alkoxy group, a di(lower alkyl)amino group or a [2-[di(lower alkyl)amino]ethyl]amino group. A discussion of these various preparations follows.

The 1,4-bis(lower alkylthio)pyridazino[4,5-d]pyridazines are conveniently prepared by reacting 1,4-dithiolpyridazino[4,5-d]pyridazine with a lower alkyl iodide in aqueous potassium or sodium carbonate solution or in an equivalent alkali metal base solution, e.g., potassium or sodium hydroxide. The carbonate is preferred. The reaction proceeds at an alkali metal iodide liberating temperature, and advantageously at room temperature. Some of the product is formed no matter what reactant proportions are used. The reaction consumes two molar proportions of alkyl iodide and of base per molar proportion of the 1,4-dithiol reactant and such proportions are therefore preferred. The 1,4-dithiol reactant is advantageously used as its equimolar pyridine complex. Upon completion of the reaction, the 1,4-bis(lower alkylthio) compound is collected and recovered.

In a convenient method of carrying out the reaction, the 1,4-dithiolpyridazino[4,5-d]pyridazine as its 1:1 complex with pyridine is brought together in the reaction medium with the aqueous potassium or sodium carbonate, the mixture is agitated, insoluble impurities are filtered off and the filtrate is reacted with alkyl iodide in a vessel previously flushed with nitrogen. Upon completion of the reaction, the crude 1,4-bis(lower alkylthio) compound is collected, washed well with water, dried and recrystallized from 1,2-diethoxyethane. When methyl iodide is used in the described procedure, 1,4-bis(methylthio)-pyridazino[4,5-d]pyridazine is obtained as product.

The 1-[2-[di(lower alkyl)amino]ethyl]amino-4-(lower alkylthio)pyridazino[4,5-d]pyridazine compounds are prepared by displacing one of the methylthio or other lower alkylthio groups of the 1,4-bis(alkylthio)pyridazino[4,5-d]pyridazine compound by reaction with an N,N-di(lower alkyl)ethylenediamine. Solvents other than hydroxylic solvents are conveniently used, e.g., dimethylformamide or chlorobenzene. Some product forms no matter what reactant proportions are used. While the reaction consumes the reagents in substantially equimolar amounts, the use of an excess of the amine reagent is preferred. The reaction proceeds at a temperature at which byproduct lower alkylthiol is evolved, advantageously at 90°–125° C. Upon completion of the reaction, the desired 1-[2-[di(lower alkyl)amino]ethyl]-amino-4-(lower alkylthio)pyridazino[4,5-d]pyridazine is separated and recovered.

In a convenient method of carrying out the reaction, the reactants are mixed together with heating. Evolution of lower alkylthiol is observed by ebullition in the resulting solution. The reaction is essentially complete when evolution of lower alkylthiol ceases. Upon completion of the reaction, unreacted N,N-di(lower alkyl)ethylenediamine is removed by distillation in vacuo. The residue is triturated with aqueous dilute mineral acid such as hydrochloric or sulfuric acid and the resulting mixture is extracted with methylene chloride. The desired product is recovered from the aqueous residue by first basifying with excess ammonium hydroxide then extracting with methylene chloride, drying the extract with a solid adsorbent and concentrating the dried extract to prepare a solution from which the product can be crystallized by addition of ether. When N,N-dimethyl-ethylenediamine is the co-reactant, the product obtained is 1-[2-(dimethylamino) ethyl]amino-4-(lower alkylthio)pyridazino[4,5-d]pyridazine. The substitution of a di(lower alkyl)amine for the N,N-di(lower alkyl)ethylene diamine gives the analogous 1-di(lower alkyl)amino-4-(lower alkylthio) compounds with evolution of lower alkylthiol byproduct.

The 1-(lower alkoxy)-4-(lower alkylthio)pyridazino [4,5-d]pyridazines are prepared directly from a 1,4-bis(lower alkylthio)pyridazino [4,5-d]pyridazine by reaction with a lower alkali metal alkoxide or with a lower alcohol and an amine catalyst. The reaction is carried out in a lower alkanol reaction medium corresponding to that from which the alkoxide has been prepared or in the presence of the catalytic amine as reaction medium when a lower alkanol reactant is used. Some product forms no matter what reactant proportions are used. The reaction consumes the reagents in substantially equimolar amounts and the use of such amounts is preferred. The reaction proceeds at a mercaptide liberating temperature, conveniently from about 50° to 75° C. Upon completion of the reaction, the desired product is separated and recovered.

In a convenient method of carrying out the reaction, the reactants are brought together in the reaction medium and mixed at reaction temperature until reaction is substantially complete. Upon completion of the reaction, the reaction solution is evaporated in vacuo to dryness to give crude product. The crude product is purified by recrystallization from methanol. When a methoxide or methyl alcohol is co-reactant, the product obtained is 1-methoxy-4-(lower alkylthio)pyridazino[4,5-d]pyridazine. Other lower alkoxides or lower alkanols are substituted for the methoxide or methanol to give the corresponding 1-(lower alkoxy)-4-alkylthio products.

The 1-di(lower alkyl)amino-4-(lower alkoxy)pyridazino [4,5-d]pyridazines are prepared by reacting a 1-di (lower alkyl)amino-4-(lower alkylthio)pyridazino[4,5-d] pyridazine with an alkali metal lower alkoxide. The reaction is carried out in a reaction medium which is the alcohol from which the alkoxide is derived. Some product forms no matter what reactant proportions are used. The reaction consumes the reagents in substantially equimolar amounts and the employment of such amounts is preferred. The reaction proceeds at a mercaptide liberating temperature, conveniently between about 50° and 70° C. Upon completion of the reaction, the desired product is separated and purified.

In a convenient method of carrying out the reaction, a 1-di(lower alkyl)amino-4-(methylthio)pyridazino[4,5-d]pyridazine and a lower alkanol are brought together in a vessel and an alkali metal alkoxide corresponding to that of the lower alkanol reaction medium is added portionwise thereto with agitation. The reaction proceeds at reaction temperature. Upon completion of the reaction, an equimolar proportion of acetic acid is added and solvent is removed from the reaction mixture under vacuum. The solid residue product is dissolved in a suitable solvent such as a solution of chloroform and methylene chloride and further purified by washing the resulting solution with water and with saturated salt solution, drying, evaporating solvent under vacuum and recrystallizing from a suitable solvent such as isopropyl alcohol to give the desired purity of product.

The 1-[2-[di(lower alkyl)amino]ethyl]amino-4-(lower alkoxy)pyridazino[4,5-d]pyridazines are also prepared from the corresponding 1-[2-[di-lower alkyl)amino] ethyl]amino-4-(lower alkyl) thiopyridazino[4,5-d]pyridazine by reaction with an alkali metal lower alkoxide. When, as in this instance, the 1-amine functionality is derived from N,N-di(lower alkyl)ethylenediamine, displacement of the remaining lower alkylthio group with alkoxide with formation of byproduct lower alkyl mercaptide requires a more concentrated alkanol solution and reflux temperaure. An addition of an equimolar proportion of dimethylsulfoxide (DMSO) to this reaction mixture appears to enhance the reaction rate. In this reaction, too, the reaction consumes the reagents in substantially equimolar proportions and the use of such proportions is preferred. The reaction proceeds at reflux temperature. Upon completion of the reaction, the desired product is recovered by conventional procedures.

In a convenient method of carrying out the reaction, the reactants are brought together in a lower alkanol reaction medium and refluxed under nitrogen until reaction is substantially complete. The reaction mixture is treated with sufficient acetic acid to form the acetate salt and the reaction mixture is evaporated in vacuo with the aid of a rotary evaporator and a vacuum pump to remove substantially all of the DMSO. The residue is partitioned between methylene chloride and dilute bicarbonate solution. The organic layer is separated and treated to recover crude product by washing with dilute salt solution, drying over magnesium sulfate and freeing of solvent. The product is dissolved in methylene chloride, and the filtrate concentrated to incipient crystallization when cyclohexane is added portionwise with warming and swirling after each portion. Purified product then crystallizes out. When the reactants are 1-[2-(dimethylamino)ethyl]amino - 4 - (methylthio)pyridazino [4,5-d]pyridazine and sodium methoxide, the product obtained is 1-[2-(dimethylamine)ethyl]amino-4-methoxypyridazino[4,5-d]pyridazine. Corresponding 1-[2-(dialkylamino)ethyl]amino-4-alkylthio and sodium alkoxide co-reactants give the other 1-[2-(dialkylamino)ethyl] amino-4-alkoxy products described and claimed herein.

The following illustrative examples describe completely representative specific embodiments and the best modes contemplated by the inventor for carrying out the invention. They are not to be considered as limiting the invention other than as claimed.

EXAMPLE 1

1,4-bis(methylthio)pyridazino[4,5-d]pyridazine

Seven hundred milliliters of water are stirred and evacuated to ca. 10 mm. to remove dissolved oxygen, atmospheric pressure being restored with nitrogen. This step is repeated whereupon 39.2 grams (0.2 mole assuming 1:1 dithiol:pyridine complex) of 1,4-dithiolpyridazino [4,5-d]pyridazine and 70 grams (0.5 mole) of potassium carbonate are added to the water and the stoppered mixture is shaken vigorously, then stirred for 10 minutes. Insoluble impurities are allowed to settle and the solution is filtered by suction, care being taken to avoid pulling excess air through the filter. After washing the filter residue with water, the filtrate is transferred in equal volumes to three Parr shaker bottles that have been flushed with nitrogen. To each bottle is added 7.7 milliliters (total, 0.4 mole) of methyl iodide; these are rubber stoppered and shaken (a Parr shaker is used) for 1.5 hours. The crude bis(thioether) is collected, washed well, and dried yielding a dark brown powder. Recrystallization from ca. 650 milliliters of 1,2-dimethoxyethane affords dark brown stout needles and rods (the product from ethanol has a light golden yellow appearance), M.P. 192–193.5° C. Ultraviolet: lambda max (MeOH), 323 (log $e$ 3.94) and 348 (log $e$ 3.92) m$\mu$; nmr (deuteriochloroform): —2.85 (singlet, —SCH$_3$) and —9.75 (singlet, ring protons) p.p.m., tetramethylsilane (TMS).

*Analysis.*—Calcd. for C$_8$H$_8$N$_4$S$_2$: C, 42.8; H, 3.60; N, 24.98; S, 28.59. Found: C, 43.0; H, 3.63; N, 24.75; S, 28.74.

EXAMPLE 2

1-[(2-dimethylamine)ethyl]amino-4-(methylthio)pyridazino[4,5-d]pyridazine

A stirred mixture of 7 grams (0.0312 mole) of 1,4-bis(methylthio)pyridazino[4,5-d]pyridazine and 50 milliliters of N,N-dimethylethylenediamine, protected from atmospheric moisture and carbon dioxide with Drierite® and Ascarite®, is heated at 90°–95° C. for 50 minutes, the evolution of methanethiol is observed by embullition in the resulting solution. Unchanged N,N-dimethylethylenediamine is removed in vacuo and the residue is triturated in 100 milliliters of N hydrochloric acid (additional 5 N hydrochloric acid is added, if necessary, to lower pH to ca. 1) and the resulting mixture is transferred to a separatory flask and extracted twice with 60 milliliter portions of methylene chloride. The aqueous layer is then decolorized with Darco®, filtered and the filtrate basified with concentrated ammonia to pH>9. This mixture is extracted with five 50-milliliter portions of methylene chloride. The combined, dried (magnesium sulfate) extracts are concentrated to about 15–20 milliliters and diluted slowly, while gently warming, with a total of 175 milliliters of ether. The golden yellow needles that form are collected after crystallization is complete; M.P. 140°–141.5° C.; Ultraviolet: lambda max (MeOH), 359 (log $e$ 3.79) m$\mu$; nmr (deuteriochloroform): —2.32 (singlet, —N(CH$_3$)$_2$), —2.70 and —2.78 (triplet, —CH$_2$—NMe$_2$ and singlet, —SCH$_3$), —3.77 (triplet —NH—CH$_2$—), —9.68 and —9.84 (ring protons) p.p.m. (TMS).

*Analysis.*—Calcd. for C$_{11}$H$_{16}$N$_6$S: C, 50.0; H, 6.10; N, 31.79; S, 12.13. Found: C, 50.3; H, 6.33; N, 31.90; S, 12.11.

EXAMPLE 3

1-methoxy-4-(methylthio)pyridazino[4,5-d]pyridazine

A stoppered mixture of 5.0 grams (0.0223 mole) of 1,4-bis(methylthio)pyridazino[4,5-d]pyridazine, 10 milliliters of dry piperidine and 350 milliliters of warm methanol (45°) in a Parr pressure bottle is heated at ca. 57° C. for 24 hours, bottle pressure being released occasionally. The reaction solution is evaporated in vacuo to dryness and the residue is recrystallized from 40 milliliters of methanol to afford short, khaki-colored needles, M.P. 153°–154.5° C. The composition of this material is determined by nmr analysis to be ca. 96 percent product and 4 percent 1,4-dimethoxypyridazino[4,5-d]pyridazine based on the integration of the methylthio and methoxyl absorptions of the former, —2.83 and —4.33 p.p.m. (TMS), respectively, and on the methoxyl absorption of the latter, —4.29 p.p.m. The purified product is obtained by three additional recrystallizations from methanol, M.P. 156°–157° C.

*Analysis.*—Calcd. for C$_8$H$_8$N$_4$OS: C, 46.1; H, 3.88; N, 26.91; S, 15.4. Found: C, 46.2; H, 3.72; N, 27.10; S, 15.3.

EXAMPLE 4

1-(dimethylamino)-4-methoxypyridazino[4,5-d]pyridazine

To a saturated solution of 7.2 grams (0.0325 mole) of 1 - (dimethylamino) - 4 - (methylthio)pyridazino[4,5-d]-pyridazine and 350 milliliters of methanol in a Parr shaker bottle is added at 40°–45° C. 1.75 grams (0.0325 mole) of sodium methoxide in 3 portions. The reaction bottle is closed with a rubber stopper, shaken, and heated at 57° for 7 hours, pressure build-up within the bottle being relieved by intermittent opening. Complete solution results within 2 hours of heating. After heating, 1.9 milliliters (0.0325 mole) of acetic acid is added and solvent is removed from the reaction mixture in vacuo. The solid yellow residue is dissolved in a solution of chloroform (100 milliliters) and methylene chloride (125 milliliters), washed twice with water and once with saturated salt solution, dried (magnesium sulfate) and evaporated in vacuo. A nmr analysis of the residue shows the crude material to consist of ca. 94 percent product and 6 percent starting material. After recrystallization from 80 milliliters of isopropyl alcohol there is obtained bright yellow fibers, M.P. 123.5°–124.5° C. The composition of this material is about the same as the crude product.

In another run, 2.2 grams of material (94 percent product and 4 percent starting material) and 0.8 gram of material (9 percent product and 91 percent starting material) are combined (equiv. to 0.004 mole of starting material) and treated as previously with 0.267 gram (0.005 mole) of sodium methoxide in 250 milliliters of methanol at 57° C., the reaction period is extended to 16.5 hours. The reaction mixture is worked up as before and the crude product is recrystallized from 35 milliliters of isopropyl alcohol. There is obtained soft yellow fibers, M.P. 125°–126.5° C. The nmr (deuteriochloroform) spectrum of this material is virtually free of starting material showing absorptions at —3.25 (singlet,

—N(CH$_3$)$_2$)

—4.26 (singlet, —OCH$_3$) and —9.78 (singlet, 2 ring protons) p.p.m. (RMS); ultraviolet: lambda max (MeOH), 342 (log $e$ 3.71) m$\mu$.

*Analysis.*—Calcd. for C$_9$H$_{11}$N$_5$O: C, 52.7; H, 5.40; N, 34.13. Found: C, 52.8; H, 5.43; N, 34.30.

EXAMPLE 5

1-[(2-(dimethylamino)ethyl)amino]-4-methoxypyridazino[4,5-d]pyridazine

A solution of sodium methoxide, 0.31 gram (0.0135 g. atom) of sodium in 50 milliliters of methanol, 3.7 grams (0.0135 mole) of 1-[(2-(dimethylamino)ethyl)-amino] - 4 - (methylthio)pyridazino[4,5 - d]pyridazine and 1.0 milliliter of dimethyl sulfoxide (B.P. 88°/25 mm.) is refluxed under nitrogen for 25 hours. The reaction mixture is treated with 0.95 milliliter of acetic acid and evaporated in vacuo with the aid of a rotary evaporator, a vacuum pump being finally used to remove most of the unchanged dimethyl sulfoxide, and the residue is partitioned between 125 milliliters of methylene chloride and dilute bicarbonate solution. The organic layer is separated, washed with dilute salt solution, dried (magnesium sulfate) and freed of solvent. The crude product still contains some dimethyl sulfoxide, but only apparent traces of the starting material; it is dissolved in 50 milliliters of methylene chloride and filtered to remove a small amount of insoluble material. The filtrate is Darco® treated, filtered and the filtrate concentrated to ca. 8–10 milliliters by warming whereupon five 20 milliliter portions of cyclohexane are added with warming and swirling after each portion. The product crystallizes as golden yellow needles, M.P. 138.5°–140.5° C.

*Analysis.*—Calcd. for $C_{11}H_{16}N_6O$: C, 53.2; H, 6.50; N, 33.85. Found: C, 53.1; H, 6.57; N, 33.66.

The following compounds of the present invention are prepared from the indicated starting materials in accordance with the methods herein described.

1,4 - bis(propylthio)pyridazino[4,5 - d]pyridazine (molecular weight 280.4) by reacting 1,4 - dithiolpyridazino-[4,5-d]pyridazine with propyl iodide.

1 - (dipropylamino) - 4 - propoxypyridazino[4,5-d] pyridazine (molecular weight 289.3) by reacting 1-(dipropylamino) - 4 - propylthiopyridazino[4,5 - d]pyridazine with sodium propoxide.

1 - [(2 - dibutylamino)ethyl]amino - 4 - butoxypyridazino[4,5-d]pyridazine (molecular weight 374.5) by reacting 1 - [(2 - dibutylamino)ethyl]amino - 4 - methylthiopyridazino[4,5-d]pyridazine with sodium butoxide.

1 - [(2 - dibutylamino)ethyl]amino - 4 - butylthiopyridazino[4,5-d]pyridazine (molecular weight 390.6) by reacting 1,4 - bis(butylthio)pyridazino[4,5 - d]pyridazine with N,N-(dibutyl)ethylenediamine.

1 - propoxy - 4 - (propylthio)pyridazino[4,5-d]pyridazine (molecular weight 264) by reacting 1,4-bis(propylthio)pyridazino[4,5-d]pyridazine with sodium propoxide.

The novel compounds of this invention are useful as analgesics for overcoming pain in animals. Such teaching is not to be construed that all compounds are equivalent. In such use, the compounds are administered parenterally, either unmodified or together with an inert carrier material. Thus, groups of mice are administered one of the test compounds dispersed in a solution of aqueous 0.5 percent methyl cellulose at various dosage rates via subcutaneous injection. The mice are subsequently challenged by the intraperitoneal injection of aqueous 0.1 percent hydrochloric acid at a dosage rate of 0.01 milliliter per gram. The mice are then placed in clear plastic cages and observed. In untreated mice, the intraperitoneal injection of this dosage of hydrochloric acid is followed by characteristic writhing of the mice, that is, flattening of the abdomen against the floor of the cage accompanied by rotation of the spine and pelvis. In representative operations, the compounds 1-[(2 - dimethylamino) ethyl]amino - 4 - (methylthio)pyridazino[4,5 - d]pyridazine, 1 - methoxy - 4 - (methylthio)pyridazino[4,5-d]pyridazine, 1 - (dimethylamino) - 4 - methoxypyridazino [4,5 - d]pyridazine and 1 - [(2 - dimethylamino)ethyl] amino - 4 - methoxypyridazino[4,5 - d]pyridazine are effective in preventing writhing in mice when administered at a dosage of 100 milligrams per kilogram.

The novel compounds of this invention are also useful as herbicides, particularly inhibiting the growth of grasses at application rates of 10 to 100 pounds per acre and higher. Such teaching is not to be construed that the compounds are equivalents for the control of a particular grass or equally effective at the same application rate.

In representative operations, 1 - (dimethylamino) - 4-methoxypyridazino[4,5 - d]pyridazine, 1 - [2 - (dimethylamino)ethyl]amino - 4 - methylthiopyridazino[4,5 - d] pyridazine and 1 - methoxy - 4 - methylthiopyridazino-[4,5-d]pyridazine when applied to soil in pre-emergent applications as aqueous dispersions at an application rate of 100 pounds per acre give a 100 percent control of the growth of germinant seeds and seedlings of wild oats, corn, milo sorghum and barnyard grass.

The predecessor intermediate compounds used to make the compounds claimed herein are prepared as follows.

4,5-pyridazinedicarboxylic acid is obtained by permanganate oxidation of phthalazine using the analogous procedure of Jones and McLaughlin for preparing the compound 2,3-pyrazinedicarboxylic acid; Organic Synthesis, Coll. Vol. IV, John Wiley & Sons, Inc., 1963, page 824.

Pyridazino[4,5 - d]pyridazine - 1,4 - diol is prepared following a modification of the procedure described by Fieser for the preparation of 5-nitro-1,4-phthalazdione; Experiments in Organic Chemistry, L. Fieser, 1955, page 199. The following procedure is conveniently used. A stirred mixture of 216 grams (1.29 moles) of 4,5-pyridazinedicarboxylic acid, 450 milliliters of water and 70 grams (1.40 moles) of 64 percent hydrazine is heated to about 95° C. to effect solution; 500 milliliters of triethylene glycol is added and the resulting solution is further heated (flame or mantle) and stirred to expel water. To facilitate removal of water a glass tube connected to a vacuum source is suspended about four or more inches above the solution's surface. The reaction temperature rises slowly and at ca. 150° (~50 minutes required) precipitation of a yellow solid begins. Heating in the range of 150°–165° is continued for 2.5 hours. When the temperature drops to 100° the reaction mixture is diluted with 2 liters of hot water. After standing overnight at room temperature the product is removed by filtration, washed with water and dried to afford 146 grams of tan powder. Addition of ca. 25 milliliters of acetic acid to the mother liquor gives, after standing 2 days, a second crop, M.P. >315° C. The product is purified for analysis by dissolving a sample in dilute ammonia, filtering and reprecipitating the diol with 5 N hydrochloric acid as a light tan powder; infrared (Nujol): $\nu$3185, 2450 (very broad), 1770 (weak, broad), 1685 (sharp), 1585 (sharp) cm.$^{-1}$.

*Analysis.*—Calcd. for $C_6H_4N_4O_2$: C, 43.9; H, 2.46; N, 34.14. Found: C, 44.1; H, 2.54; N, 34.20.

1,4-dithiolpyridazino[4,5-d]pyridazine is prepared by reacting the preceding 1,4-diol with phosphorus pentasulfide in the presence of redistilled pyridine, as follows. To a stirred suspension of 168 grams (1.025 moles) of 1,4 - pyridazino[4,5 - d]pyridazinediol in 3 liters of redistilled pyridine under a constant atmosphere of carbon dioxide is added cautiously in tablespoon portions, 500 grams (2.25 moles) of phosphorus pentasulfide (M.P. 278–280°). About 20 minutes is required for the addition during which time the reaction temperature does not exceed 60°. The reaction mixture is then heated at 98°–101° for 2 hours, solution resulting. The bulk (1.8–2 l.) of pyridine is removed from the reaction mixture by distillation at ca. 35–40 mm. and a pot temperature of 40°–50° with continued stirring. When the concentration is complete the reaction residue, a thick, black, mobile paste, is chilled to about 10°–13° and atmospheric pressure is restored with nitrogen. Under a nitrogen atmosphere is added, very cautiously, with continued cooling and stirring, cold 2 N ammonia, initially several drops at a time. The ensuing reaction, release of hydrogen sulfide and frothing, is allowed to subside before adding more ammonia. The quantity of ammonia that can be added safely, i.e., holding the reaction temperature below 30° and limiting excessive frothing, gradually increases until further additions cause no change in the mixture. A total of 8 liters of cold 2 N ammonia is added, the last half rapidly. This mixture is allowed to warm to room temperature and stirred for 5 hours, the atmosphere being maintained. After dividing into two portions, the ammoniacal solution is quickly acidified to pH 5 with a total of 500 milliliters of glacial acetic acid. The resulting mixtures are refrigerated for several days and the product is collected on one filter, washed well with water and dried yielding 181.7 grams of maroon prisms, M.P. 203°–206° dec. with gas (alkaline to wet litmus) evolution. The product crystallizes with pyridine; heating a sample at 200° in a mass spectrometer produces an intense spectrum of pyridine. The crude dithiol is dissolved in dilute ammonia and filtered through filter-aid free of apparent inorganic impurities. The filtrate is diluted with a little pyridine, acidified to pH 4–5 with acetic acid and seeded. There are obtained dark bronze crystals, M.P. 206°–209° dec. with prior discoloration beginning around 199°. Recrystallization from dimethylformamide (maximum solution temperature 80°) affords the analytical 1:1 pyridine complex of the dithiol as a reddish-brown solid which decomposes without melting above 180°.

*Analysis.*—Calcd. for $C_6H_4N_4S_2 \cdot C_5H_5N$: C, 48.0; H, 3.29; N, 25.4; S, 23.3. Found: C, 47.6; H, 3.54; N, 25.7; S, 23.2.

What is claimed is:
1. A compound corresponding to the formula

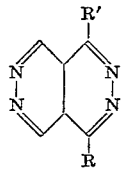

wherein R represents lower alkylthio or lower alkoxy, and R' represents lower alkylthio, di(lower alkyl)amino or [2-[di(lower alkyl)amino]ethyl]amino.

2. The compound of claim 1 wherein R and R' each represents a methylthio group.

3. The compound of claim 1 wherein R' represents a [2-(dimethylamino)ethyl]amino group and R represents a methylthio group.

4. The compound of claim 1 wherein R' represents a methoxy group and R represent a methylthio group.

5. The compound of claim 1 wherein R' represents a dimethylamino group and R represents a methoxy group.

6. The compound of claim 1 wherein R' represents a [(2-(dimethylamino)ethyl)]amino group and R represents a methoxy group.

References Cited
UNITED STATES PATENTS

| 3,138,593 | 6/1964 | Burch | 260—250 |
| 3,164,595 | 1/1965 | Burch et al. | 260—250 |

NICHOLAS S. RIZZO, Primary Examiner

U.S. Cl. X.R.

71—92; 424—250

PO-1050
(5/69)

UNITED STATES PATENT OFFICE
CERTIFICATE OF CORRECTION

Patent No. 3,494,921          Dated February 10, 1970

Inventor(s) Linneaus C. Dorman

It is certified that error appears in the above-identified patent and that said Letters Patent are hereby corrected as shown below:

In Col. 1, line 53, delete "(" before the word, butoxy.

In Col. 2, delete lines 4 and 5 and insert in its place -- azino[4,5-d]pyridazine, 1-[2-(dipropylamino)ethyl]amino-4--(propylthio)pyridazino[4,5-d]pyridazine,--.

In Col. 4, line 56, delete "(dimethylamine)" and insert in its place --(dimethylamino)--.

In Col. 5, line 17, delete "323" and insert in its place --232--.

In Col. 8, line 58, insert after "the", --nitrogen--.

SIGNED AND
SEALED
SEP 22 1970

(SEAL)
Attest

Edward M. Fletcher, Jr.
Attesting Officer

WILLIAM E. SCHUYLER, JR.
Commissioner of Patents